(12) United States Patent
Lageson et al.

(10) Patent No.: US 9,862,581 B2
(45) Date of Patent: Jan. 9, 2018

(54) ADJUSTABLE LOAD SUPPORTING STAND APPARATUS AND METHOD

(71) Applicant: Bosch Automotive Service Solutions, Inc., Warren, MI (US)

(72) Inventors: Larry Lageson, Ellendale, MN (US); Corday Peterson, Owatonna, MN (US); John T. May, Oshkosh, WI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 0 days.

(21) Appl. No.: 14/850,458

(22) Filed: Sep. 10, 2015

(65) Prior Publication Data

US 2017/0073204 A1    Mar. 16, 2017

(51) Int. Cl.
*F16M 11/00* (2006.01)
*B66F 13/00* (2006.01)
*F16M 11/28* (2006.01)

(52) U.S. Cl.
CPC ............. *B66F 13/00* (2013.01); *F16M 11/28* (2013.01); *F16M 2200/028* (2013.01)

(58) Field of Classification Search
CPC ....... E04G 25/04; E04G 25/061; E04G 25/06; E04G 2025/043; E04G 2025/042; F16M 2200/028; F16B 7/105
USPC ......... 248/407, 354.5, 354.6, 352, 423, 351, 248/519; 403/109.2, 109.8, 109.6, 378, 403/379.1, 379.4, 379.6
See application file for complete search history.

(56) References Cited

U.S. PATENT DOCUMENTS

| 453,094 A | 5/1891 | Taylor | |
| 1,895,717 A * | 1/1933 | Kelley | A47G 33/12 248/529 |
| 3,730,027 A | 5/1973 | Rohn | |
| 4,385,849 A | 5/1983 | Crain | |
| 4,556,163 A | 12/1985 | Lundman | |
| 4,653,142 A * | 3/1987 | Upton | A47L 13/24 15/144.4 |
| 5,335,754 A | 8/1994 | Gibson | |
| 5,379,566 A * | 1/1995 | Schworer | E04G 25/04 248/354.3 |
| 5,520,360 A | 5/1996 | Wensman | |

(Continued)

OTHER PUBLICATIONS

Non-Final Office Action dated Aug. 28, 2014 for U.S. Appl. No. 13/682,437.

(Continued)

*Primary Examiner* — Christopher E Garft
(74) *Attorney, Agent, or Firm* — Baker Hostetler LLP (57) ABSTRACT

The disclosure describes load supporting stands and methods of supporting a load. Such systems and methods may include providing a load supporting stand with a column having an outer diameter, and a first end opposite a second end, a saddle attached to the first end of the column, a load bearing pin that extends transversely through the column and may be fixedly attached to the column, and a conduit capable of receiving the column, and a plurality of pin receiving slots disposed in the conduit and capable of receiving the pin, wherein the conduit may be capable of receiving the column and pin through the first end of the conduit, and wherein the column may be configured to be rotated within the conduit to translate upward from a top of the conduit such that the saddle engages the load to be supported.

14 Claims, 8 Drawing Sheets

(56) References Cited

U.S. PATENT DOCUMENTS

| | | | |
|---|---|---|---|
| 5,680,732 A | 10/1997 | Skouras | |
| 5,901,935 A | 5/1999 | Lai | |
| 5,988,754 A | 11/1999 | Lamart et al. | |
| 6,138,973 A | 10/2000 | Woodward | |
| 6,550,727 B2* | 4/2003 | Butterfield | B62D 1/184 248/188.5 |
| 7,240,885 B1 | 7/2007 | Sullivan | |
| 8,066,247 B2 | 11/2011 | Spera | |
| 2004/0178306 A1* | 9/2004 | Hallberg | F16M 11/046 248/188.5 |
| 2006/0096224 A1* | 5/2006 | Asbury | F16B 5/02 52/582.1 |
| 2007/0262228 A1* | 11/2007 | McCracken | E04G 25/06 249/24 |
| 2008/0244996 A1* | 10/2008 | Gillespie | E04G 25/06 52/169.9 |
| 2010/0089854 A1* | 4/2010 | Keyvanloo | A47B 9/083 211/183 |
| 2014/0145042 A1* | 5/2014 | Adamson | F16M 11/046 248/125.8 |
| 2016/0223000 A1* | 8/2016 | Aninos | F16B 7/105 |

OTHER PUBLICATIONS

Final Office Action dated Apr. 21, 2015 for U.S. Appl. No. 13/682,437.

\* cited by examiner

ADJUSTABLE LOAD SUPPORTING STAND APPARATUS AND METHOD

TECHNICAL FIELD

This disclosure relates generally to a load supporting stand such as a jack stand. More particularly, the present disclosure relates to an adjustable jack stand that can be raised or lowered by an operator to support a load such as a vehicle or the like.

BACKGROUND

Elevating a portion of a vehicle typically involves using some sort of jack. For example, many vehicles carry or employ a scissor-type jack to elevate a portion of the vehicle in order to change a tire or otherwise view the underside of the vehicle. Typically, during operation the jack is placed under a portion of the frame of the vehicle and the jack is slowly raised until a platform on the jack engages the frame of the vehicle. Thereafter, a user elevates a portion of the frame using the principle of leverage. A user may place a jack stand or load bearing stand under the frame and lower the jack so that the vehicle is supported on the jack stand, instead of by the jack itself. Alternatively, the jack stand may be used solely to support the vehicle in such cases where it is not desired to employ a jack or elevate the vehicle.

A jack stand is typically a stable platform for supporting the vehicle. Because the jack and jack stand have individual and separate support structures, the jack stand and jack typically cannot support the vehicle at the same location on the frame. Or, the jack stand or jack must engage the frame of the vehicle only at designated positions or areas, though it can be difficult to identify such locations. Additional complexity can occur when an automotive manufacturer designates only certain locations on a vehicle to be used as jacking locations. Generally, vehicle manufacturers reinforce certain locations on the frame of a vehicle so that those certain locations can support a portion of the weight of the vehicle when the vehicle is elevated with a jack or some sort of support mechanism.

Generally, jack stands can vary in size, shape and geometry. For example, some designs comprise pyramid-shaped structures having three or four sides and an adjustable support platform disposed in the top of the jack stand. Such designs further include a telescoping support member extending from a top portion of the pyramid and a curved horizontal support, often having a U-shape, at the top of the telescoping support member to cradle a portion of the vehicle frame. The support member is often adjustable with a ratchet type mechanism. Such previous designs can be difficult to operate and employ several components which must be cast or machined to fine tolerances. This can be a drawback as casting can be inconsistent with regard to tolerances, and machining can be expensive.

Accordingly, there is a need for improved adjustable load supporting stands. Various aspects of the disclosure may solve one or more of these problems and/or disadvantages.

SUMMARY

In one aspect, the disclosure describes a load supporting stand, including a column having an outer diameter, and a first end opposite a second end, a saddle attached to the first end of the column, a load bearing pin that extends transversely through the column and is fixedly attached to the column, wherein a length of the pin is longer than the outer diameter of the column, and a conduit capable of receiving the column, the conduit having an inner diameter greater than the outer diameter of the column, and a plurality of pin receiving slots disposed in the conduit and capable of receiving the pin, wherein the conduit is capable of receiving the column and pin through the first end of the conduit.

In another aspect, the disclosure describes a method of supporting a load, the method including placing a load supporting stand at a desired position under a load to be supported, wherein the stand includes a column having an outer diameter, and a first end opposite a second end, a saddle attached to the first end of the column, a load bearing pin that extends transversely through the column and is fixedly attached to the column, wherein a length of the pin is longer than the outer diameter of the column, and a conduit capable of receiving the column, the conduit having an inner diameter greater than the outer diameter of the column, and a plurality of pin receiving slots disposed in the conduit and capable of receiving the pin, wherein the conduit is capable of receiving the column and pin through the first end of the conduit, rotating the column and translating the column upward from a top of the conduit such that the saddle engages the load to be supported, and rotating the column so that the load bearing pin engages at least one of the plurality of pin receiving slots.

In yet another aspect, the disclosure describes a load supporting stand, including a column defining an outer diameter, a load bearing pin fixedly extending from the outer diameter of the column, and a conduit capable of receiving the column, the conduit having an inner perimeter having dimensions greater than the outer diameter of the column, with at least a portion of the inner perimeter having a dimension greater than that of the load bearing pin extending from the column and another portion of the inner perimeter having a dimension less than that of the load bearing pin extending from the column, and a plurality of pin receiving slots disposed in the conduit and capable of receiving the pin, wherein the column is configured to be rotatable within the conduit to a first position where the load bearing pin does not contact the conduit allowing the column to translate upward or downward in the conduit.

Further and alternative aspects and features of the disclosed principles will be appreciated from the following detailed description and the accompanying drawings. As will be appreciated, the systems and methods disclosed herein are capable of being carried out in other and different aspects, and capable of being modified in various respects. Accordingly, it is to be understood that both the foregoing general description and the following detailed description are exemplary and explanatory only and do not restrict the scope of the appended claims.

DETAILED DESCRIPTION

Now referring to the drawings, wherein like reference numbers refer to like elements, load supporting stands are illustrated. Any numerical values recited herein are by way of illustration only. In other aspects, other values may be used, and the values can be varied in any fashion as appropriate to the application.

An exemplary aspect of the disclosure provides a load supporting stand with a column with a saddle attached to the first end of the column, a load bearing pin that extends transversely through the column and may be fixedly attached to the column, a conduit capable of receiving the column, and pin receiving slots disposed in the conduit and capable of receiving the pin. The conduit may be capable of receiving the column and pin through the first end of the conduit, and the column may be configured to be rotated within the conduit to translate upward from a top of the conduit such that the saddle engages the load to be supported or translate downward to disengage the saddle from the load. The pin may be placed transversely through the cylinder or round tube such that the pin extends out of opposite sides of the cylinder a sufficient distance to engage slots in the outer square tube or conduit when the pin is oriented either parallel or perpendicular to the side walls of the outer square tube (e.g., at a 0 or 90 degree angle with respect to a side wall of the square tube). When the pin is oriented at a 45 degree angle with respect to a side wall of the square tube, the ends of the pin can fit into opposite corner space of the square tube, allowing the cylinder with the pin to be moved up and down for height adjustment as desired. In some aspects, a pin or ends of a pin can be welded to the surface of the column and not extend transversely through the column.

Figure 1:
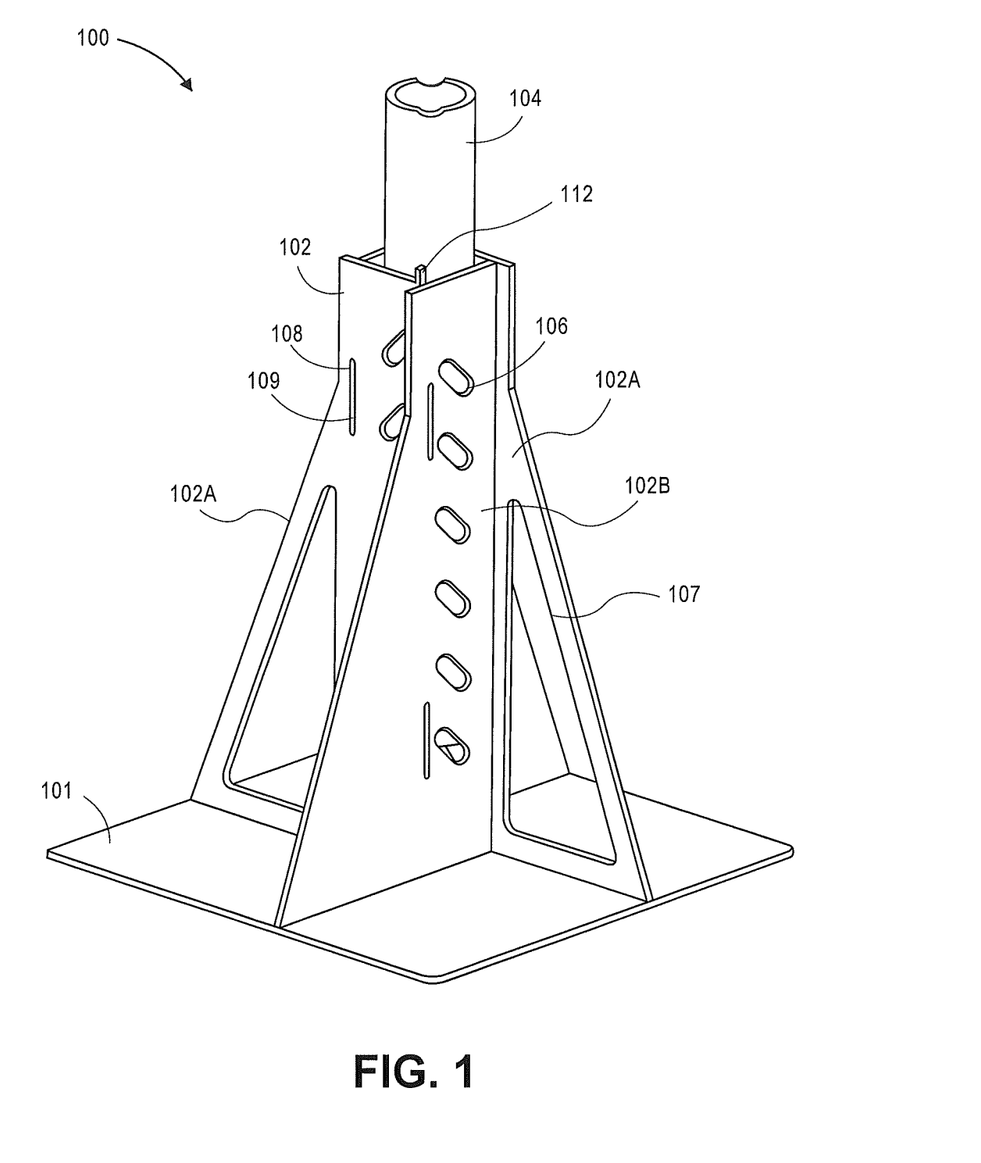
FIG. 1 illustrates a perspective view of a load supporting stand according to an aspect of the disclosure.

FIG. 1 illustrates a perspective view of a load supporting stand according to an aspect of the disclosure. The load supporting stand 100 shown in FIG. 1 can include a column 104 with a first end opposite a second end, and a saddle 103 (FIG. 1A) coupled to the first end of the column 104. A load bearing pin 110 (FIG. 2) can extend transversely through the column 104. In an aspect, a length of the load bearing pin 110 can be longer than the outer diameter of the column 104. A load bearing pin 110 may also extend outwardly from an outer surface of the column 104 or only partially extend through the column 104. A conduit 102 can be formed from one or more plates 102A and 102B, and be capable of receiving the column 104. The conduit 102 can have an inner perimeter having a dimension greater than the outer diameter of the column 104 to allow the column 104 to be at least partially disposed within the conduit 102 and allow for the column 104 to be movable relative to the conduit 102. A plurality of pin receiving slots 106 are located in the conduit 102 for receiving the load bearing pin 110. The conduit 102 may be capable of receiving the column 104 and pin 110 through a top end of the conduit 102. A base plate 101 can be coupled to the column 104 and extend generally perpendicular to a longitudinal axis of the column 104. In some aspects, plates 102A and 102B may be parallel to each other.

The conduit 102 can be formed by a number of plates 102A and 102B coupled together. In FIG. 1, the plates 102A are shown with holes 107 that form a handle or area that can be gripped by a user in the plate 102A, while the plates 102B are shown without holes 107. In certain aspects, the conduit 102 can be formed from only plates 102A, only plates 102B, or combinations thereof. In the aspect shown in FIG. 1, four plates are used to form the conduit 102, using two plates 102A and two plates 102B, where each of the plates 102A and 102B are located opposite or parallel to each other.

The plates 102A and 102B can have tab 108 and tab holes 109, where the tabs 108 of one plate fit into the tab holes 109 of an adjacent plate. Then, the plates 102A and 102B can be welded together at the intersection formed between the plates at the tabs 108 and tab holes 109. In another aspect, the conduit 102 can be formed from a single piece of material instead of plates joined together. In the aspect shown in FIG. 1, the pin receiving slots 106 are disposed at about a 45 degree angle. In other aspects, other shapes or orientations of the pin receiving slots 106 can be used (e.g., FIG. 1A).

In certain aspects, the column 104 may be a circular tube, and the conduit 102 may form a square channel capable of receiving the column 104. In other aspects, other shapes of the column 104 and conduit 102 can be used, such as each having square or circular cross sections, as long as the column 104 is moveable within the column 104 in a direction perpendicular to the base 101.

In the aspect shown in FIG. 1, the plate 102A is shown with bendable tab 112 extending in a direction parallel to the column 104 and perpendicular to the base 101. The bendable tab 112 can be configured to be bent in a direction towards the inner surface of the conduit 102, such as towards the column 104, to prevent the load bearing pin 110, and thus the column 104, from exiting the top end of the conduit 102. Any number of bendable tabs 112 can be used. In the load supporting stand of FIG. 1, each plate 102A has a bendable tab 112, while the plates 102B do not. In other aspects, the plates 102B can have bendable tabs 112.

Figure 1A:
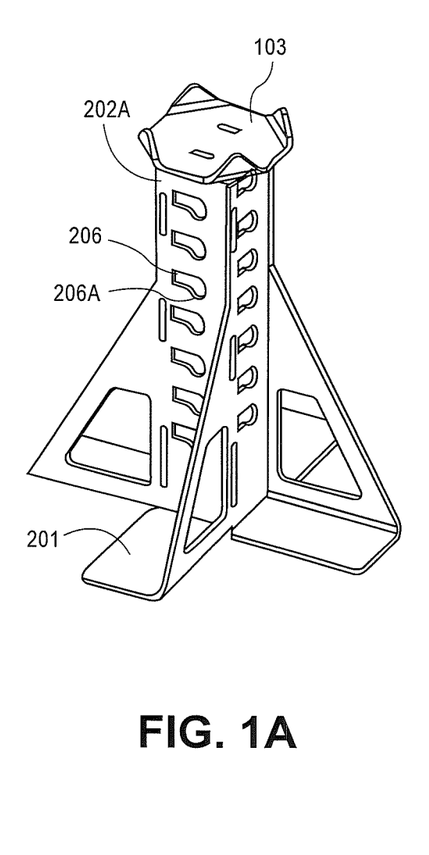
FIG. 1A illustrates a perspective view of a load supporting stand according to another aspect of the disclosure.

FIG. 1A illustrates a perspective view of a load supporting stand according to another aspect of the disclosure. In the aspect shown in FIG. 1A, each plate 202a has a base 201 that can either be formed as part of the plates 202a, or can be coupled to the plates 202a by welding or other means. The pin receiving slots 206 shown in FIG. 1A are horizontal, where each pin receiving slot 206 has a notch 206A extending downward towards the base 201. The pin receiving slot 206 and notch 206A are sized such that they can receive the load bearing pin 110 (as seen in FIG. 2).

Figure 3:
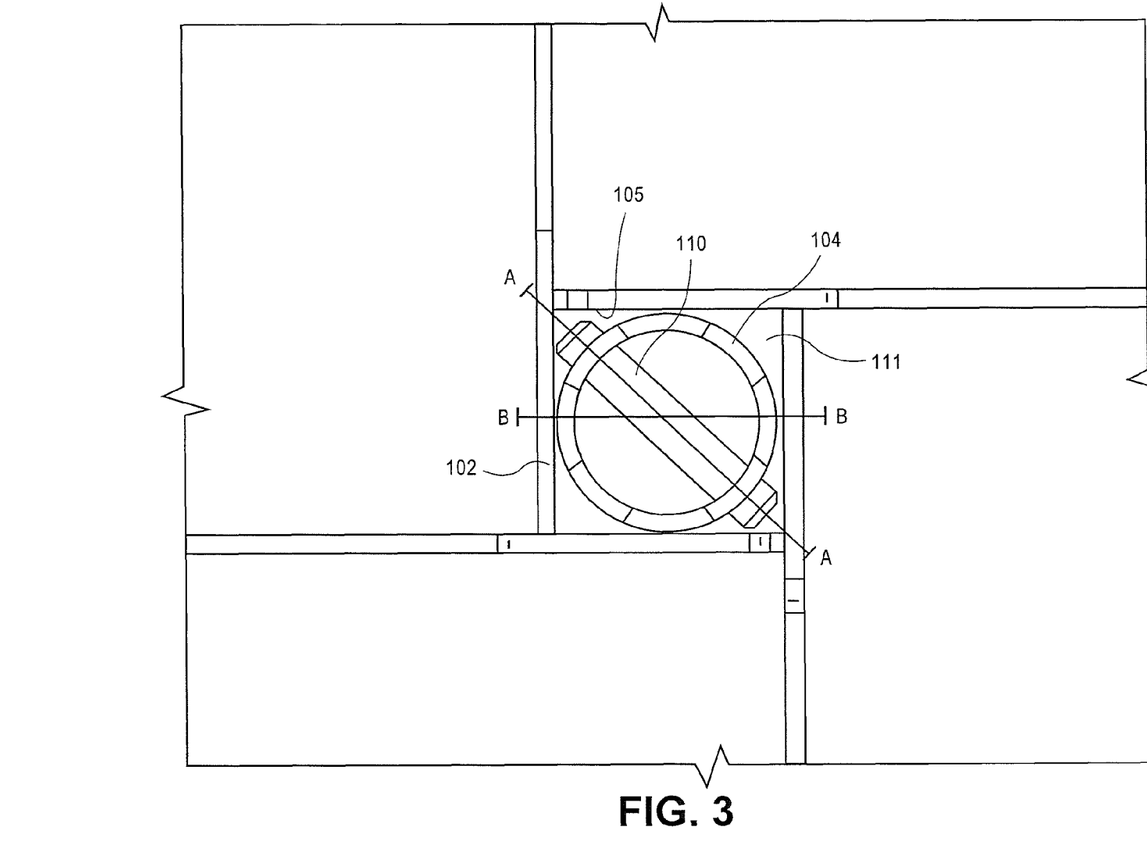
FIG. 3 illustrates a top view of a load supporting stand with a column and a pin located within a conduit according to an aspect of the disclosure.

In certain aspects, a maximum length of the load bearing pin 110 may be less than a maximum distance between opposite corners of a cross section of the conduit 202 (as seen in FIG. 3) to allow the column 104 to move up and down within the conduit 202, so that the height of the column 104 and the saddle 103 can be adjusted to a desired height. When a desired height is reached, such as when the saddle 103 contacts a load to be supported, the column 104 can be rotated to move the load bearing pin 110 into a pin receiving slot 106. The saddle 103 can be coupled to the column 104 by any suitable method, such as welding, screws, bolts, or the like. In certain aspects, the saddle 103 can be any suitable shape such it is capable of supporting a desired load.

Figure 1B:
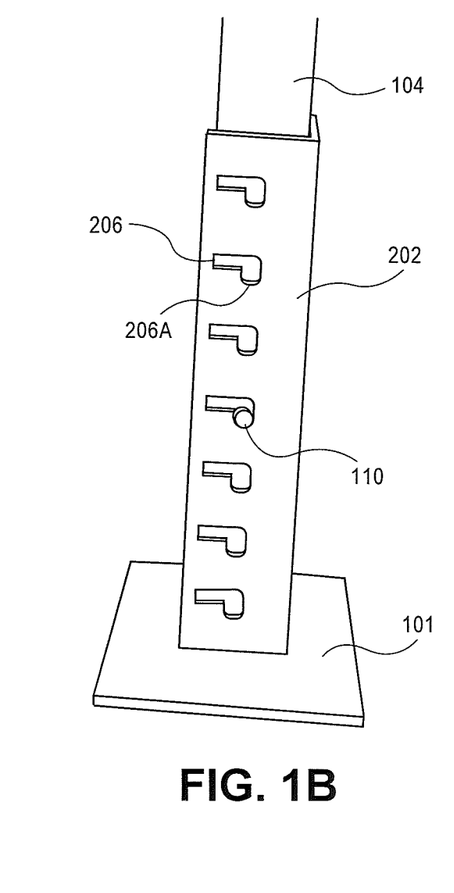
FIG. 1B illustrates a front view of a load supporting stand according to another aspect of the disclosure.

FIG. 1B illustrates a front view of a load supporting stand according to another aspect of the disclosure. In FIG. 1B, the conduit 202 is shown as a square tube with column 104 extending from the top end of the conduit 202. In some aspects, the conduit 202 can be welded to the base 101. In an aspect the conduit 202 can be made of a single piece of material, as opposed to being formed by the joining of plates. The pin 110, pin receiving slots 206, and notches 206A can be similar to those previously described.

Figure 2:
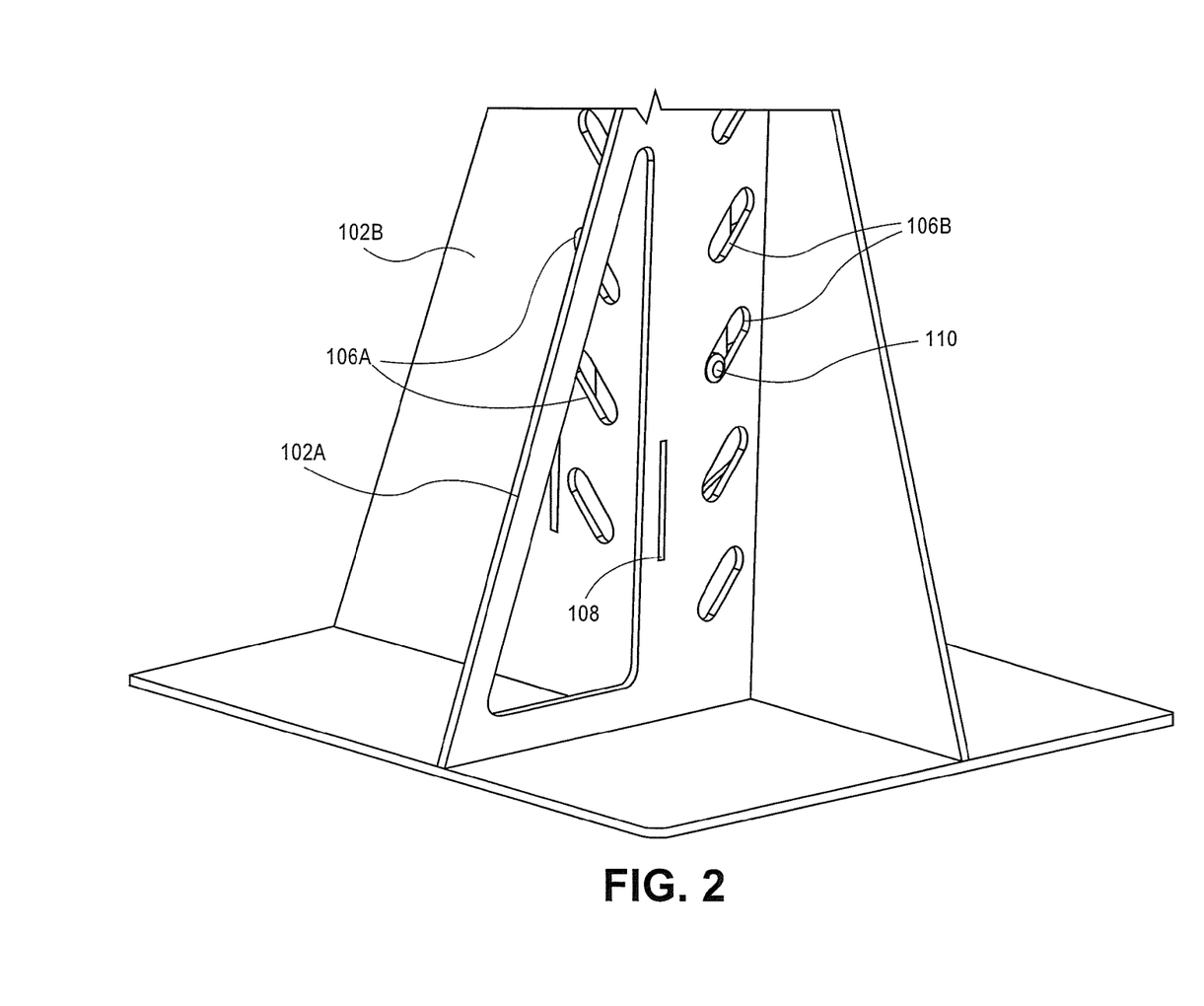
FIG. 2 illustrates a perspective view of a load supporting stand with a pin located in a pin receiving slot according to an aspect of the disclosure.

FIG. 2 illustrates a perspective view of a load supporting stand with a pin located in a pin receiving slot according to an aspect of the disclosure. The pin receiving slots 106 are sized such that they can receive an end of the load bearing pin 110. In an aspect, an end of the load bearing pin 110 has a frustoconical shape. The load supporting stand 100 in FIG. 2 is shown with the load bearing pin 110 located in a bottom end of a pin receiving slot 106. In such a configuration the load supporting stand 100 can be capable of supporting a load.

As can be seen in the aspect of FIG. 2 for example, the pin receiving slots 106B in plate 102A can be vertically offset from pin receiving slots 106A in the plate 102B. Such a configuration can allow for additional height options when positioning the saddle 103. For example, the pin receiving slots 106B of opposing plates 102A may be positioned about one inch apart from each other on a plate 102A, allowing height adjustments of about one inch for each pin receiving slot 106B in a plate 102A. The pin receiving slots 106A in plates 102B may also be positioned about one inch apart from each other on a plate 102B, however, they may be offset at heights a half of an inch above or below the adjacent pin receiving slots 106B in plate 102A, allowing for finer height adjustments of a half of an inch increments as opposed to using only the pin receiving slots 106B in plates 102A alone. Other offset increments such as ½ or ⅓ of an inch or other increments are also within the disclosure.

Figure 3A:
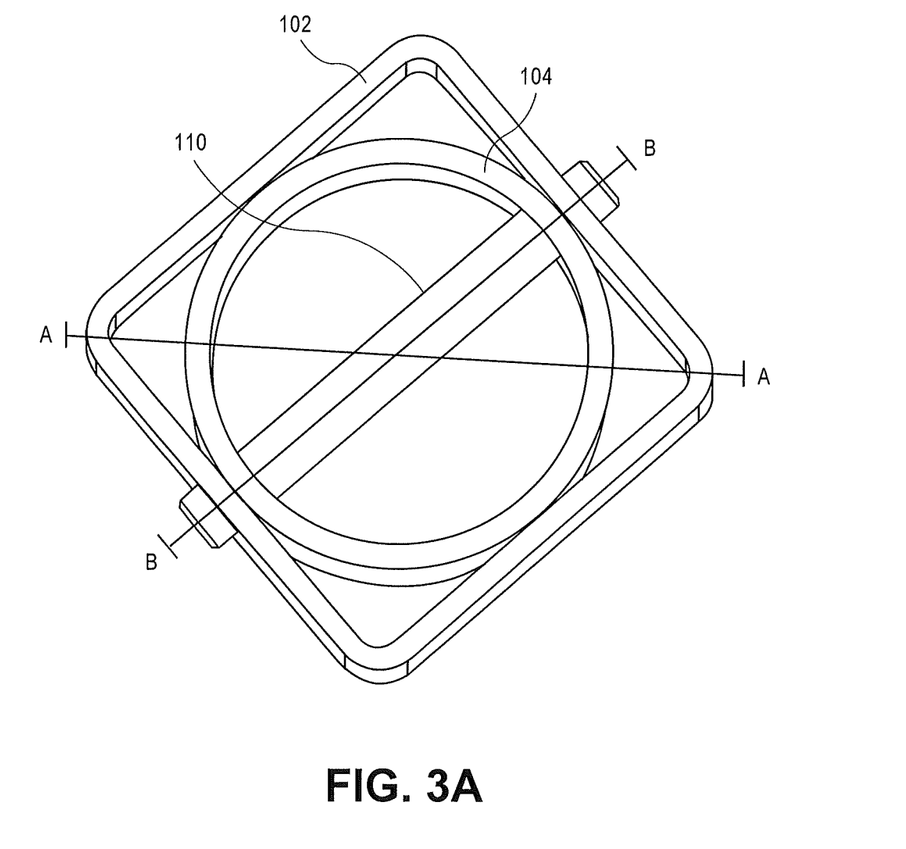
FIG. 3A illustrates a top view of a conduit of a load supporting stand with a pin located within pin receiving slots in a conduit according to an aspect of the disclosure.

FIG. 3 illustrates a top view of a load supporting stand with a column and a pin located within a conduit according to an aspect of the disclosure. As seen in FIG. 3, when the load bearing pin 110 is oriented along the line A-A of FIG. 3, the load bearing pin 110 is not engaged within the pin receiving slots 106A or 106B, but located in the free space or open area 111 of the corners 105 of the conduit 102, and the column 104 can then be moved within the conduit 102 in a direction perpendicular to the base 101 (FIG. 1) to adjust the height of the column 104. The column 104 can then be rotated about 45 degrees in either a clockwise or counter-clockwise direction to engage pin receiving slots 106A or 106B in the sides of the conduit 102 such that the saddle 103 (FIG. 1A) is at a desired height. When the load bearing pin 110 is oriented along the line B-B of FIG. 3, which is about 45 degrees from line A-A, the load bearing pin 110 may then be engaged within the pin receiving slots 106 (FIG. 3A). In some aspects, the load bearing pin 110 may be fixedly attached to the column 104 by welding. Further, the ends of the pin 110 may simply be welded to the outer surface of the column 104.

FIG. 3A illustrates a top view of a conduit of a load supporting stand with a pin located within pin receiving slots in a conduit according to an aspect of the disclosure. In FIG. 3A, when the load bearing pin 110 is oriented along the line B-B of FIG. 3A, the load bearing pin 110 is engaged within the pin receiving slots 106A or 106B. As seen in FIG. 3A, the load bearing pin 110 may be placed transversely through the column 104 such that the ends of the pin 110 extend out of opposite sides of the column a sufficient distance to engage pin receiving slots 106A or 106B in the conduit 102, when the pin is oriented either parallel or perpendicular to the side walls of the conduit 102 (e.g., at a 0 or 90 degree angle with respect to a side wall of the conduit 102).

Figure 4:
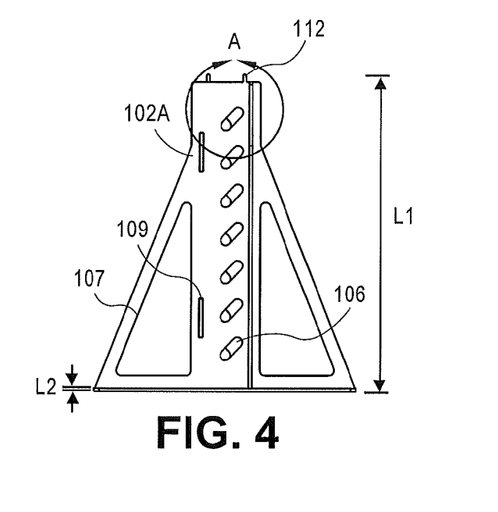
FIG. 4 illustrates a side view of a load supporting stand according to an aspect of the disclosure.

FIG. 4 illustrates a side view of a load supporting stand according to an aspect of the disclosure. In an aspect, the height (L1) of the conduit 102 may be about 200-400 mm, and the thickness (L2) of the base 101 may be about 2-5 mm. For example, the height (L1) of the conduit 102 may be about 308 mm, and the thickness (L2) of the base 101 may be about 3.2 mm. The tab 112 can be similar to the tab 112 previously described.

Figure 4A:
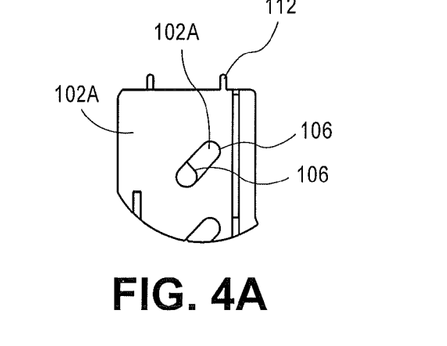
FIG. 4A illustrates is an isolated, enlarged view taken from circle-A in FIG. 4 according to an aspect of the disclosure.

FIG. 4A illustrates is an isolated, enlarged view taken from circle-A in FIG. 4 according to an aspect of the disclosure. In an aspect, one end of the load bearing pin 110 can fit concentrically through the bottom of the pin receiving slot 106, while the opposite end of the load bearing pin 110 can fit concentrically through the bottom of the pin receiving slot on the opposite side of the conduit 102. In some aspects, the pin receiving slots 106 on opposing plates 102A are position at 45 degree angles in opposite directions from each other, as seen in FIGS. 4 and 4A. The tab 112 can be similar to the tab 112 previously described.

Figure 5:
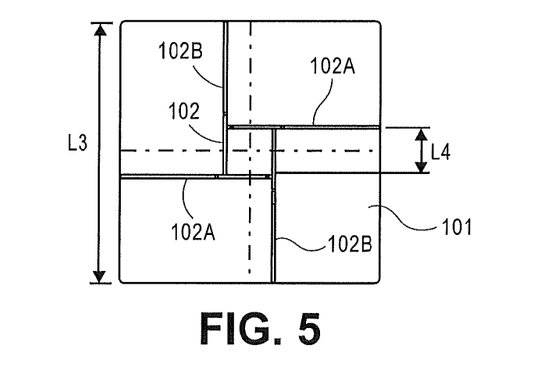
FIG. 5 illustrates a top view of a load supporting stand according to an aspect of the disclosure.

FIG. 5 illustrates a top view of a load supporting stand according to an aspect of the disclosure. In an aspect, the width (L3) of the base 101 may be about 200-300 mm, and the width (L4) of the conduit 102 may be about 30-60 mm. For example, the width (L3) of the base 101 may be about 260 mm, and the width (L4) of the conduit 102 may be about 46 mm. In some aspects, the base 101 may be square.

Figures 6, 6A, 6B:
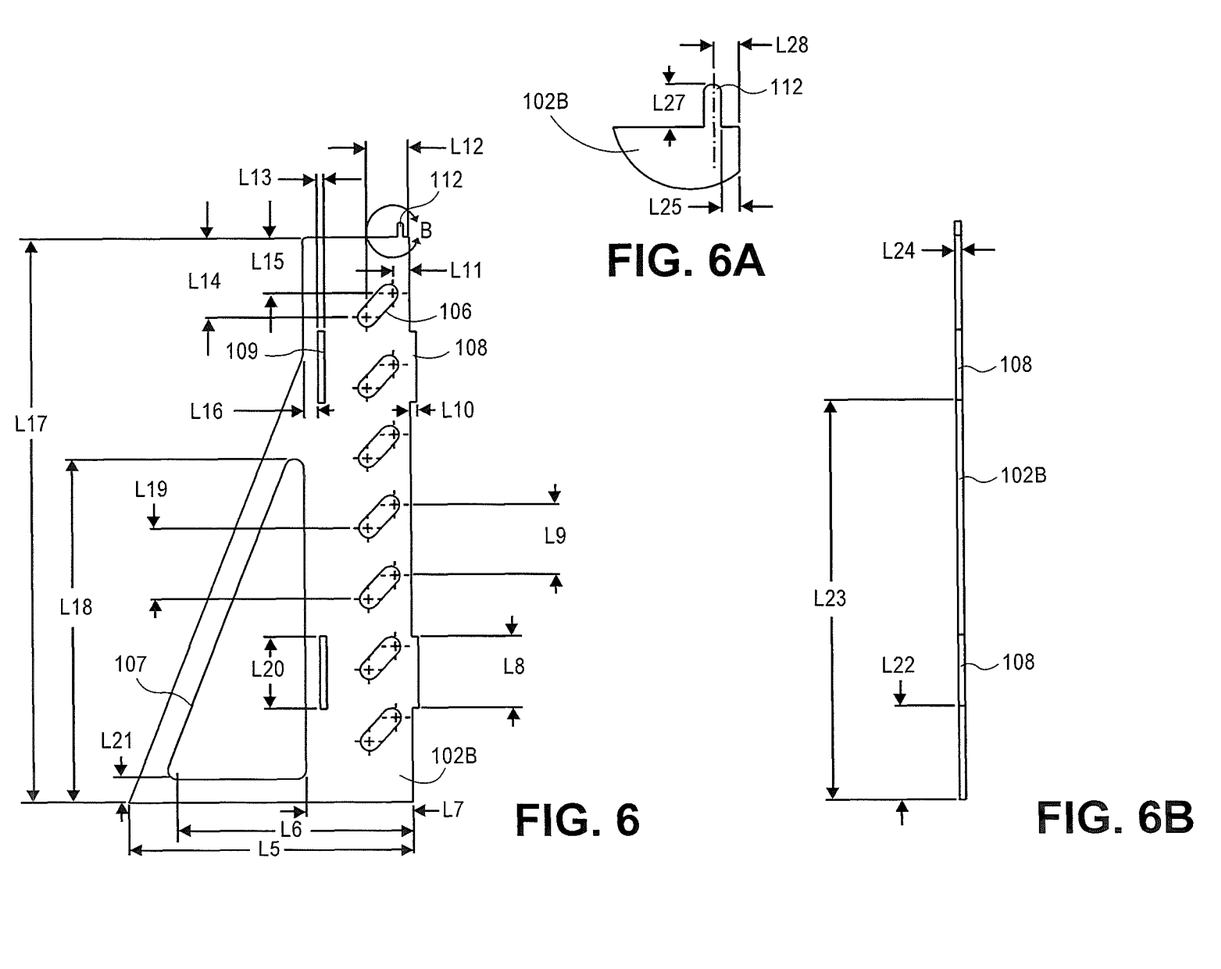
FIG. 6 illustrates a side view of a plate of a load supporting stand according to an aspect of the disclosure.
FIG. 6A illustrates is an isolated, enlarged view taken from circle-B in FIG. 6 according to an aspect of the disclosure.
FIG. 6B illustrates a front view of a plate of a load supporting stand according to an aspect of the disclosure.

FIG. 6 illustrates a side view of a plate of a load supporting stand according to an aspect of the disclosure. In some aspects, the length (L5) of the plate 102A may be about 100-200 mm, the length (L6) may be about 100-150 mm, the length (L7) between the hole 107 and the tab 108 may be about 40-70 mm, the length (L8) of the tab 108 may be about 30-50 mm, the height (L10) of the tab 108 may be about 2-5 mm, and a width (L13) of a tab hole 109 may be about 2-5 mm. For example, the length (L5) of the plate 102A may be about 152 mm, the length (L6) may be about 126 mm, the length (L7) between the hole 107 and the tab 108 may be about 57 mm, the length (L8) of the tab 108 may be about 38 mm, the height (L10) of the tab 108 may be about 38 mm, and a width (L13) of a tab hole 109 may be about 3.7 mm.

In certain aspects, a distance (L9, L19) between a center of an end of the pin receiving slot 106 and a center of an end of an adjacent pin receiving slot 106 may be about 30-50 mm, a distance (L11) between a center of a top end of the pin receiving slot 106 and the tab 108 may be about 5-15 mm, and a distance (L12) between a center of a bottom end of the pin receiving slot 106 and the tab 108 may be about 10-30 mm. For example, a distance (L9, L19) between a center of an end of the pin receiving slot 106 and a center of an end of an adjacent pin receiving slot 106 may be about 38 mm, a distance (L11) between a center of a top end of the pin receiving slot 106 and the tab 108 may be about 9 mm, and a distance (L12) between a center of a bottom end of the pin receiving slot 106 and the tab 108 may be about 23 mm.

In some aspects, a vertical distance (L14) between the bendable tab 112 and the center of a bottom end of the pin receiving slot 106 may be about 30-60 mm, a vertical distance (L15) between the bendable tab 112 and the center of a top end of the pin receiving slot 106 may be about 20-40 mm, a horizontal distance (L16) between the hole 107 and the tab hole 109 may be about 5-10 mm, and a height (L20) of the tab hole 109 may be about 30-50 mm. For example, a vertical distance (L14) between the bendable tab 112 and the center of a bottom end of the pin receiving slot 106 may be about 43 mm, a vertical distance (L15) between the bendable tab 112 and the center of a top end of the pin receiving slot 106 may be about 30 mm, a horizontal distance (L16) between the hole 107 and the tab hole 109 may be about 8 mm, and a height (L20) of the tab hole 109 may be about 39 mm.

In aspects, a distance (L17) between the bendable tab 112 and the bottom of plate 102A may be about 200-400 mm, a height (L18) of the hole 107 may be about 150-250 mm, and a distance (L21) between the bottom of the hole 107 and the bottom of the plate 102A may be about 10-15 mm. For example, a distance (L17) between the bendable tab 112 and the bottom of plate 102A may be about 305 mm, a height (L18) of the hole 107 may be about 185 mm, and a distance (L21) between the bottom of the hole 107 and the bottom of the plate 102A may be about 13 mm.

FIG. 6A illustrates is an isolated, enlarged view taken from circle-B in FIG. 6 according to an aspect of the disclosure. In certain aspects, a distance (L25) may be about 2-5 mm, a height (L27) of the bendable tab 112 may be about 5-10 mm, and a distance (L28) may be about 3-6 mm. For example, the distance (L25) may be about 3 mm, the height (L27) of the bendable tab 112 may be about 7.62 mm, and the distance (L28) may be about 4.6 mm.

FIG. 6B illustrates a front view of a plate of a load supporting stand according to an aspect of the disclosure. In certain aspects, a distance (L22) from the bottom of a lower tab 108 to the base of the plate 102A may be about 40-60 mm, a distance (L23) from the bottom of the upper tab 108 to the base of the plate 102A may be about 190-240 mm, and a thickness of the plate 102A may be about 2-5 mm. For example, a distance (L22) from the bottom of a lower tab 108 to the base of the plate 102A may be about 51 mm, a distance (L23) from the bottom of the upper tab 108 to the base of the plate 102A may be about 216 mm, and a thickness of the plate 102A may be about 3.4 mm.

Figure 7:
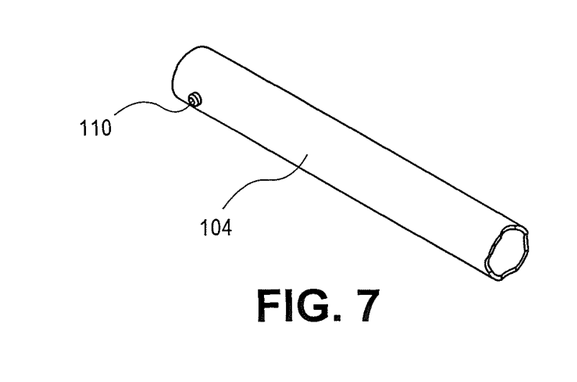
FIG. 7 illustrates a perspective view of a column and a pin according to an aspect of the disclosure.

FIG. 7 illustrates a perspective view of a column and a pin according to an aspect of the disclosure. In the aspect shown in FIG. 7, the load bearing pin 110 is shown disposed in a hole located in a side of the column 104.

Figure 7A:
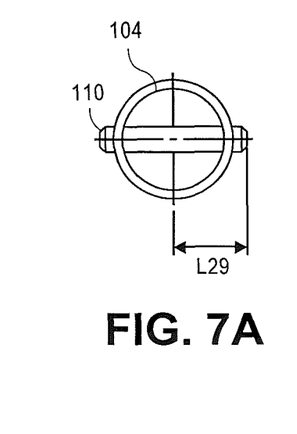
FIG. 7A illustrates a front view of a column and a pin according to an aspect of the disclosure.

FIG. 7A illustrates a front view of a column and a pin according to an aspect of the disclosure. In certain aspects, a distance (L29) from an end of the load bearing pin 110 to the center of the column 104 may be about 20-35 mm. For example, a distance (L29) from an end of the load bearing pin 110 to the center of the column 104 may be about 27 mm.

Figure 7B:
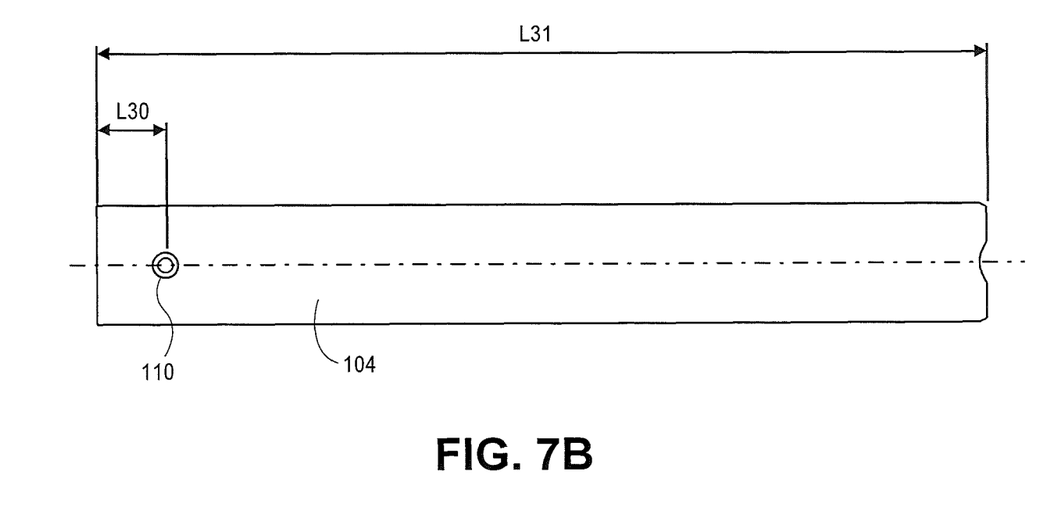
FIG. 7B illustrates a side view of a column and a pin according to an aspect of the disclosure.

FIG. 7B illustrates a side view of a column and a pin according to an aspect of the disclosure. In some aspects, a distance (L30) from the center of an end of the load bearing pin 110 to an end of the column 104 may be about 20-35 mm, and a length (L31) of the column may be about 250-400 mm. For example, a distance (L30) from the center of an end of the load bearing pin 110 to an end of the column 104 may be about 25 mm, and a length (L31) of the column may be about 330 mm.

In certain aspects, a method of supporting a load can be performed by placing a load supporting stand 100 at a desired position under a load to be supported, rotating the column 104 and translating the column 104 upward from a top of the conduit 102 such that the saddle 103 engages the load to be supported, and rotating the column 102 so that the load bearing pin 110 engages at least one of the plurality of pin receiving slots 106. The column 104 can then be rotated about 45 degrees to disengage the load bearing pin 110 from the plurality of pin receiving slots 106. In some aspects, where the pin receiving slots 106 are angled as shown in FIG. 1, the column 104 can be lifted and rotated at the same time to disengage the load bearing pin 110 from the plurality of pin receiving slots 106. The column 104 can then be translated downward into the conduit 102, and the saddle 103 disengaged from the load that was supported. In an aspect, the maximum length of the load bearing pin 110 can be shorter than a maximum distance between opposite corners 105 of the conduit 102, such that when the column 104 is rotated in a direction about 45 degrees from a position where the column 104 can translate upward to engage the plurality of pin receiving slots 106 with the load bearing pin 110.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A load supporting stand, comprising:
   a column having an outer diameter, and a first end opposite a second end;
   a saddle attached to the first end of the column;
   a load bearing pin that extends transversely through the column and is fixedly attached to the column, wherein a length of the pin is longer than the outer diameter of the column;
   a conduit capable of receiving the column and having a plurality of plates, the conduit having an inner diameter greater than the outer diameter of the column, and a plurality of pin receiving slots disposed in the conduit and capable of receiving the pin;
   wherein each plate of the plurality of plates comprises at least one tab extending in a direction parallel to the column, the tab configured to be bent in a direction towards the column to prevent the column from exiting the conduit; and wherein the conduit is capable of receiving the column and pin through the first end of the conduit.

2. The load supporting stand of claim 1, wherein the conduit includes corners comprising open areas, the column configured to be rotatable within the conduit to a first position where ends of the load bearing pin are located in the open areas to allow the column to translate upward or downward in the conduit, and wherein the column is configured to be rotatable within the conduit to a second position where the ends of the load bearing pin engage at least one of the plurality of pin receiving slots.

3. The load supporting stand of claim 1, further comprising:
a base plate coupled to the conduit, the base plate extends generally perpendicular to a longitudinal axis of the conduit.

4. The load supporting stand of claim 1, wherein the plurality of plates comprises four plates.

5. The load supporting stand of claim 1, wherein each plate of the plurality of plates comprises a second tab, and a tab receiving slot, wherein a second tab of one of the plurality of plates is configured to be inserted into the tab receiving slot of a second of the plurality of plates.

6. The load supporting stand of claim 5, wherein the second tab is welded to the tab receiving slot.

7. The load supporting stand of claim 6, wherein each plate of the plurality of plates comprises a base.

8. The load supporting stand of claim 1, wherein the column is a circular tube.

9. The load supporting stand of claim 1, wherein a cross section of the conduit is square.

10. The load supporting stand of claim 1, wherein the plurality of pin receiving slots are disposed at a 45 degree angle.

11. The load supporting stand of claim 1, wherein an end of the pin has a frustoconical shape.

12. The load supporting stand of claim 1, wherein the pin is welded to the column.

13. A load supporting stand, comprising:
a column defining an outer diameter;
a load bearing pin fixedly extending from the outer diameter of the column; and
a conduit capable of receiving the column and having a plurality of plates, the conduit having an inner perimeter having dimensions greater than the outer diameter of the column, with at least a portion of the inner perimeter having a dimension greater than that of the load bearing pin extending from the column and another portion of the inner perimeter having a dimension less than that of the load bearing pin extending from the column, and a plurality of pin receiving slots disposed in the conduit and capable of receiving the pin;
wherein each plate of the plurality of plates comprises at least one tab extending in a direction parallel to the column, the tab configured to be bent in a direction towards the column to prevent the column from exiting the conduit; and
wherein the column is configured to be rotatable within the conduit to a first position where the load bearing pin does not contact the conduit allowing the column to translate upward or downward in the conduit.

14. The load supporting stand of claim 13, wherein the column is configured to be rotatable within the conduit to a second position where the load bearing pin engages at least one of the plurality of pin receiving slots.

* * * * *